United States Patent
Wohlsen et al.

(10) Patent No.: US 10,068,007 B1
(45) Date of Patent: Sep. 4, 2018

(54) INTERFACE BETWEEN A VIRTUAL PERSONAL ASSISITANT AND AN INTERACTIVE VOICE RESPONSE SYSTEM

(75) Inventors: Robert C. Wohlsen, Menlo Park, CA (US); Jason Ethridge, Boca Raton, FL (US)

(73) Assignee: Open Invention Network, LLC, Durham, NC (US)

( * ) Notice: Subject to any disclaimer, the term of this patent is extended or adjusted under 35 U.S.C. 154(b) by 0 days.

(21) Appl. No.: 13/434,336

(22) Filed: Mar. 29, 2012

(51) Int. Cl.
  G06F 17/30 (2006.01)
  H04M 1/725 (2006.01)
  H04L 12/18 (2006.01)
  H04L 29/06 (2006.01)

(52) U.S. Cl.
  CPC .. G06F 17/30663 (2013.01); G06F 17/30973 (2013.01); *H04L 12/1813* (2013.01); *H04L 29/06027* (2013.01); *H04M 1/72561* (2013.01); *H04M 2201/40* (2013.01); *H04M 2203/355* (2013.01)

(58) Field of Classification Search
  CPC ... H04W 88/02; H04W 4/02; G06F 17/30663; G06F 17/30976; H04L 12/1813; H04L 29/06027; H04M 1/72561; H04M 2201/40; H04M 2203/355
  USPC .................................................... 455/422.1
  See application file for complete search history.

(56) References Cited

U.S. PATENT DOCUMENTS

| | | | | |
|---|---|---|---|---|
| 6,513,063 B1* | 1/2003 | Julia | ...................... | G06F 9/465 707/E17.071 |
| 6,604,129 B2* | 8/2003 | Slutsman | ............ | H04L 12/1813 348/E7.083 |
| 2003/0112931 A1* | 6/2003 | Brown | .................. | H04M 1/247 379/93.23 |
| 2007/0043687 A1* | 2/2007 | Bodart | ................. | G06Q 10/107 |
| 2007/0135101 A1* | 6/2007 | Ramati | ................. | H04M 3/493 455/414.1 |
| 2009/0181660 A1* | 7/2009 | Lazaridis | ....................... | 455/418 |
| 2013/0152092 A1* | 6/2013 | Yadgar | ............... | G10L 15/1822 718/102 |

* cited by examiner

*Primary Examiner* — Frantz Bataille
(74) *Attorney, Agent, or Firm* — Haynes and Boone, LLP

(57) ABSTRACT

An interface is provided for an IVR system. The interface receives a transaction request from a Virtual Personal Assistant (VPA) for a transaction provided by the IVR system and determines the transaction pertaining to the request. The interface then executes the respective IVR transaction application and converts the voice prompts of the IVR application to semantic data requests that can be interpreted by the VPA.

19 Claims, 4 Drawing Sheets

INTERFACE BETWEEN A VIRTUAL PERSONAL ASSISITANT AND AN INTERACTIVE VOICE RESPONSE SYSTEM

FIELD

This disclosure relates to transactions using interactive voice response systems and/or virtual personal assistant applications.

BACKGROUND

Smart phones are now capable of fast, accurate, dictation style speech recognition using an external server. The service is offered for free by several vendors. When coupled with basic natural language understanding and temporal and spatial awareness, we have a new, exciting channel for ecommerce. Products are already on the market, e.g., Apple's Siri virtual personal assistant (VPA), that 'know' the user and allow instant access to information and can handle transactions without dialing a number or entering a URL. The scope of activities possible is only limited by the availability of data in a format that machines can understand, i.e., the semantic web.

A transaction undertaken on a smart phone using a VPA has much in common with transactions offered over standard phones, both mobile and landline, using Interactive Voice Response (IVR) systems. Due to the limited screen size of a smart phone, the choices presented to the user at any point are limited, resulting in a serial process flow. Input is limited to relatively short strings, either spoken or typed. Users are more likely to undertake such transaction using a smart phone when it is through a VPA as many parts (e.g., names, locations, and preferences) can be supplied by the phone independently. The introduction and rapid acceptance of a Virtual Personal Assistances (VPA) product, such as Apple iPhone 4S with Siri, suggests that more such products will appear and the scope of transactions that they can handle will increase rapidly.

What is required is a system and method that will enable existing IVR systems to interact with VPAs.

SUMMARY

In order to make existing IVR transactions visible to mobile device users that utilize a Virtual Personal Assistant (VPA), an interface is provided for an IVR system. The interface receives a transaction request from a VPA for a transaction provided by the IVR system and determines the transaction pertaining to the request. The interface then executes the respective IVR transaction application and converts the voice prompts of the IVR application to semantic data requests that can be interpreted by the VPA. The interface can provide data to the IVR application from data provided in the initial transaction request. Any missing data fields can be requested from the VPA. If the VPA is unable to provide the missing data from data available to the VPA, the VPA is able to prompt the user with text, audio and/or images prompts to obtain the missing data for the transaction.

In one aspect of the disclosure, there is provided a method for providing a transaction to a mobile device executing a Virtual Personal Assistant (VPA) from an Interactive Voice Response (IVR) system comprising one or more IVR applications configured to provide one or more transactions to phone devices using an interactive voice response menu through which the respective IVR application obtains data for a transaction data set of the respective transaction. The method may comprise providing an interface in the IVR system for receiving a transaction request from a VPA, establishing a connection between a mobile device executing a VPA and the interface, receiving into the interface of the interactive voice response system from the VPA a transaction request for a transaction provided by the IVR system, determining an IVR application from the transaction request, and executing the determined IVR application in the interface to provide the transaction pertaining to the IVR application to a user of the mobile device from which the transaction request was received.

In one aspect of the disclosure, there is provided an Interactive Voice Response (IVR) system comprising one or more transaction applications, a transaction agent and an interface. The one or more transaction applications may be programmed to obtain a transaction data set for a transaction of the respective transaction application using a series of voice prompts. The transaction agent may be configured to receive a transaction data set for a transaction and execute the respective transaction using the received transaction data set. The interface may be configured to communicate with a Virtual Personal Assistant (VPA) of a mobile device transaction, execute a transaction application in response to a transaction request received from the VPA, convert one or more voice prompts of a transaction application to one or more data requests, and provide the one or more data requests to the VPA.

In one aspect of the disclosure, there is provided a non-transitory computer readable medium comprising computer executable instructions, that, when executed by one or more processors, cause the one or more processors to receive a transaction request from a Virtual Personal Assistant (VPA) of a mobile device, determine a transaction application pertaining to the transaction request, convert one or more voice prompts within the transaction application to one or more semantic data requests understandable by the VPA, and provide the one or more semantic data requests to the VPA.

BRIEF DESCRIPTION OF THE DRAWINGS

Reference will now be made, by way of example only, to specific embodiments and to the accompanying drawings in which.

DETAILED DESCRIPTION

Figure 1:
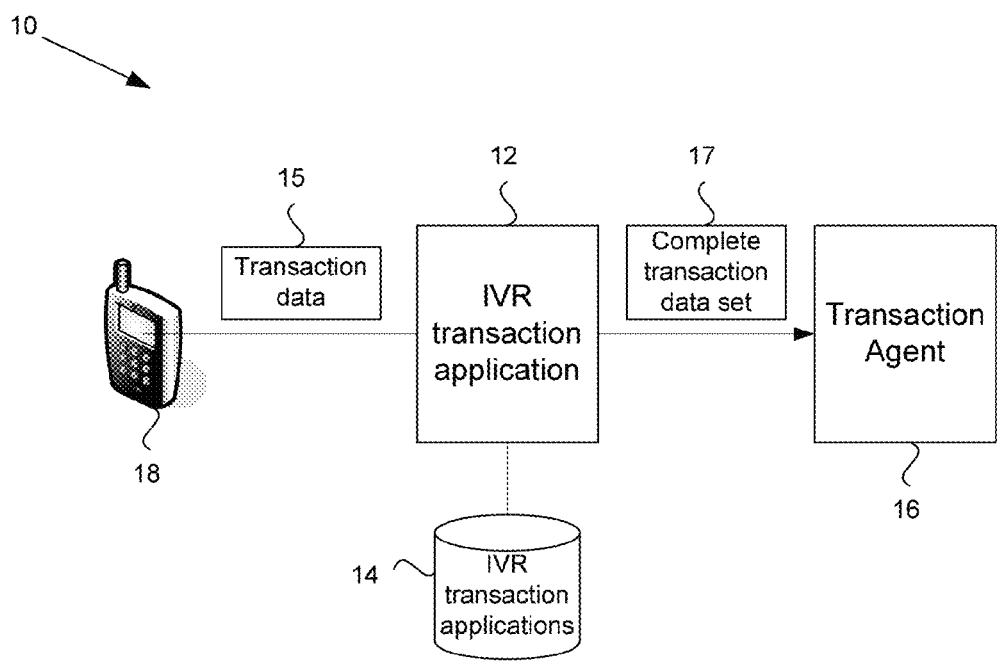
FIG. 1 shows a prior art IVR system.

In FIG. 1, there is shown a conventional prior art transaction system 10 that utilizes an IVR. The IVR system 10 includes a database 14 of IVR applications 12. Each IVR application 12 pertains to a transaction. When an IVR application 12 is executed, e.g. in response to a user connection by phone device 18, the IVR application 12 provides voice prompts to the connected user that guide the user through the transaction, in the process extracting the data 15 necessary to define the transaction. When the data set for a transaction is complete, the IVR application 12 passes the complete data set to a transaction agent 16 for fulfilling the transaction. Many transaction types are available including, without limitation, purchasing, subscriptions, order inquiries, information services, directory applications, etc. Fulfilling the transaction may also include payment processing.

By necessity, the data requests of an IVR application 12 are typically provided as a series of requests so that responses can be easily correlated with their respective request, rather than providing multiple requests simultaneously. The voice prompts are thus programmed to be provided in a sequential and logical order until the transaction data set is complete.

VPA interactions are similar to IVR interactions. A main difference is that the VPA may be able to pass relevant information pre-stored in the VPA equipped phone to the transaction agent by itself, i.e. without specific prompting from the IVR transaction sequence, thus speeding up and simplifying the transaction process from the user's perspective. The user needn't be active in this data passing as the VPA can do it on its own. The VPA also handles the capture of user input and conversion into semantic chunks that can be used in the transaction. The present inventors have recognized that transaction agents and applications that were designed for access via an IVR interface can be used for VPA interactions if the user input and output functions are replaced with an interface designed to interact with a VPA.

Figure 2:
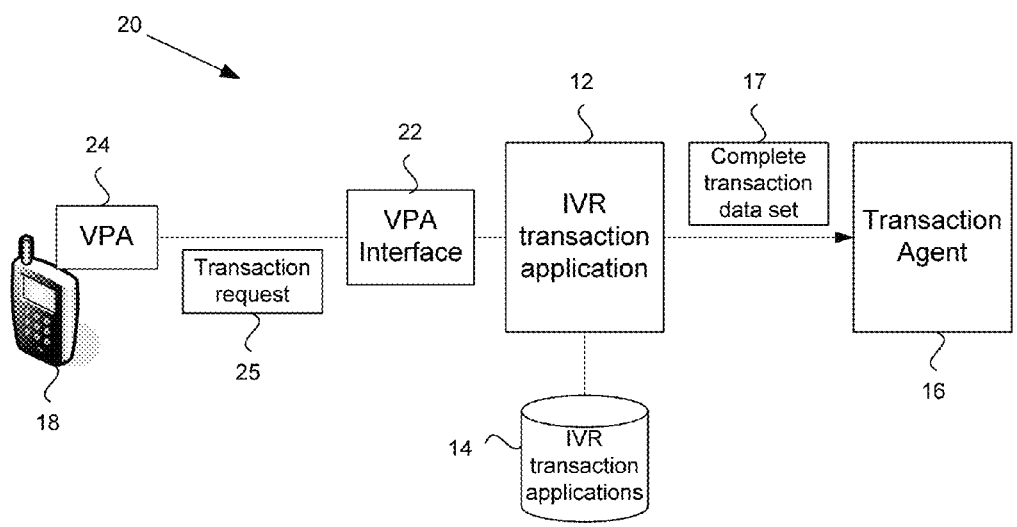
FIG. 2 shows an IVR system with an interface for communication with a VPA application of a mobile device.

FIG. 2 shows an IVR system 20 that incorporates an interface 22 between the conventional IVR system components and a VPA application 24 executing on mobile device 18.

Figure 3:
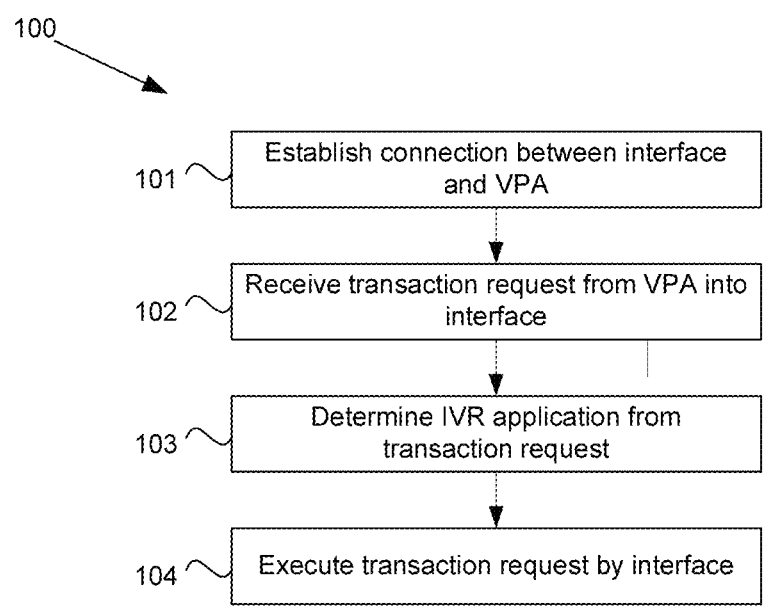
FIG. 3 shows a process for providing a transaction to a user of a mobile device utilizing a VPA application.

FIG. 3 shows a method 100 for providing a transaction to a user of the mobile device 18 using the system 20 of FIG. 2. At step 101, a connection is established between the interface 22 and the VPA 24. The interface 22 receives a transaction request 25 from the VPA (step 102), determines an IVR application 12 form the transaction request (step 103) and executes the IVR application 12 (step 104).

The IVR application 12 is typically a VoiceXML application that is programmed to execute using IVR menus that provide a sequence of voice prompts to a user. The VoiceXML application receives user input, which may be spoken input or selections entered through a keypad of a phone device. The input provided by the user completes a transaction data set that is then used to execute and process the transaction of the IVR application.

In executing the IVR transaction application 12, a function of the interface 22 is to convert voice prompts within the transaction application 12 to data requests that are understandable by the VPA application 24 of the mobile device 18. A further function is convert data from the VPA, provided in the initial transaction request or in response to subsequent data requests, into data that can be handled by the transaction application 12.

For a VPA driven transaction, the interface 22 is provided between the VPA and the IVR application and replaces the recognition and playback components that would ordinarily be presented to the user. The interface is able to read the semantic chunks provided by the VPA and use them to respond to the IVR requests for information.

Figure 4:
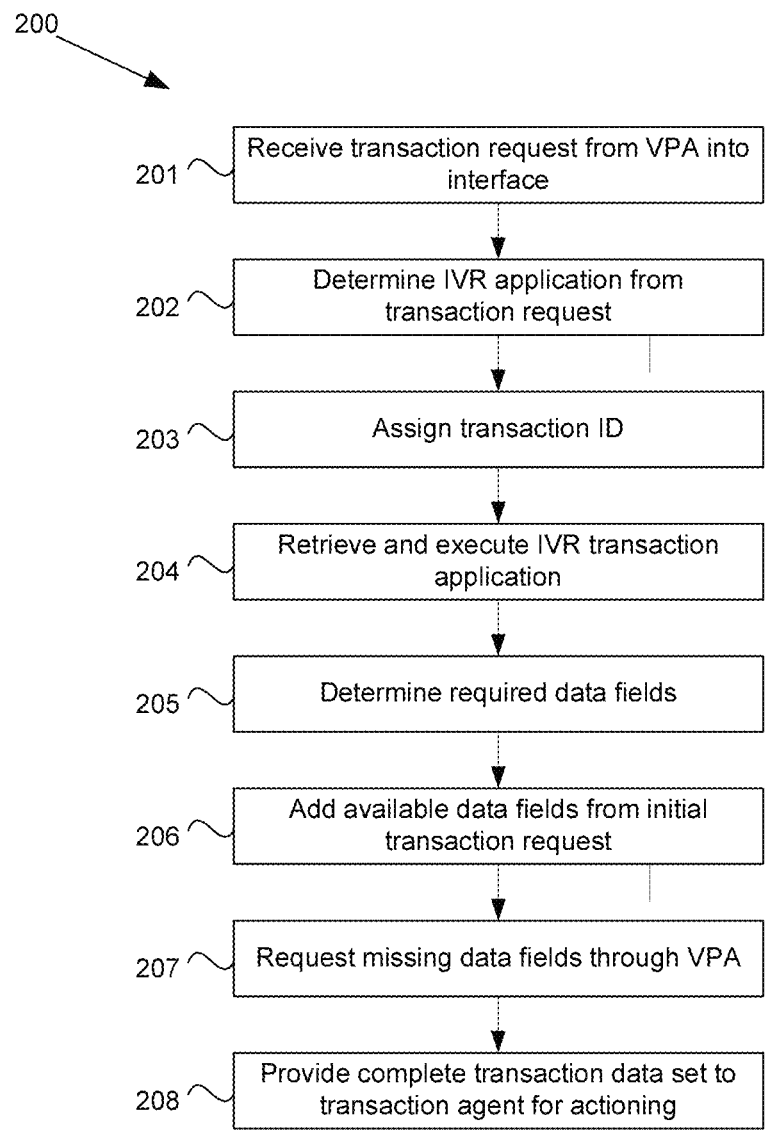
FIG. 4 shows a more detailed transaction process.

A more detailed flowchart of a transaction is depicted in FIG. 4. At the commencement of the process 200, the interface 22 receives an initial transaction request 25 from the mobile device 18 of the user (step 201). The initial contact would be similar to an initial inquiry to a semantic web page. The API for the resource would specify what fields would need to be filled. Using the 800 Flowers application as an example, the initial message from the Virtual Assistant might look like this: (http://west.interactive.com/800Flowers/query?input=send+her+some+flowers+too&appid=Siri&action=order+flowers&type= birthday+bouquet&model=XXXX&message=XXXX& toName=Jane+Doe&toAddress=100+Main+ Street&toCity=AnyTown&toState=Anystate&toZip= 12345&orderid=XXXX&format=text,image,wav). Key elements are: the resource address, text of original query, source of query, various details of the transaction, followed by data forms that the requesting device can handle.

The interface 22 processes the initial transaction request 25 to determine an IVR application 12 to which the transaction request 25 pertains (step 202) and assigns a transaction ID to the transaction (step 203). The initial transaction request 25 may identify the IVR application 12 only or may include a complete or partial transaction data set required to complete the transaction. In one embodiment, the IVR application 12 can be ascertained from a contact number used by the VPA to contact the IVR system 20.

At step 204, the interface 22 retrieves the IVR application 12, e.g. from database 14, and begins executing the IVR application 12 to determine the required data fields for the transaction (step 205). In one embodiment, the interface 22 processes the IVR application script sequentially so that whenever a data field is encountered in the application script, the interface replaces the playback prompts that would ordinarily be provided to the user through the conventional IVR menu with a search of the data provided by VPA. Available data fields are added from the VPA data (step 206) while any missing data fields are requested from the VPA 24 (step 207). Once all data has been provided for the IVR application 12, i.e. once the transaction data set is complete, the IVR application 12 can action the transaction request by providing the complete data set to the transaction agent 16 (step 208) using the programming previously configured for the conventional IVR system.

In one embodiment, the interface 22 executes the IVR application and when it comes to a place where the IVR application 12 is asking for data, it looks through the data that was received from the VPA to see if it has what is needed, enters it, and continues execution. The interface 22 continues execution of the IVR application 12 until it reaches the end of the IVR application script or it encounters a data request for which it can't find the data required. When a missing data field is encountered, the interface 22 tells the VPA 24 what it needs. When and if the data is supplied, the interface 12 continues executing the IVR application 12. This process will be continued until the transaction is completed or the user chooses to break the transaction off.

In an alternative embodiment, the interface executes the entire IVR application before providing any data request to the VPA. For example, if the initial inquiry contains all of the information necessary to complete the transaction then the resource would simply provide the response and the session would be completed. But if the resource determines that further information is necessary, it would include the request in the response. The response would also include a session identifier so that when the resource was contacted again by this user it could pick up where it left off.

Because the interface 22 does not know when a response to a data request is coming from the VPA 24, in one embodiment, the interface 22 will kill the original 'call' after sending the data request. When a response is forthcoming, the transaction ID can be used to enable the interface 22 to continue the transaction processing from where it left off.

When providing a supplemental data request from the interface to the VPA, in addition to the machine understandable semantic request, the interface can provide presentations to the to the user, such as by providing forms that the user can respond to, including, without limitation: text, audio and image presentations. If the VPA can provide the information from its own memory it will do so and not ask the user, otherwise the user will be asked.

If the data provided by the mobile device in response to a data request is spoken data spoken by the user, the existing recognition and playback components of the IVR application can be utilized to analyze the user response to extract the data components from the user's speech.

The data supplied by the VPA in the initial contact may be the user's input sentence that the VPA cannot interpret but knows is associated with an application of the IVR system 20. In this case, a statistical language model (SLM) (not shown) may be associated with the interface that can process the spoken sentence and extract an IVR application identity and any initial data spoken by the user that can be used in processing the identified IVR application.

An example use case will now be described.

A VPA of user Johnny's mobile device may be programmed with a reminder regarding his mother's birthday. At the appropriate reminder point, a reminder exchange between the VPA and Johnny may be as follows:

VPA: <earcon and display> REMINDER: Mom's birthday is in 2 days.
User: "Remind me to call her in the morning"
VPA: (Extracts details from utterance based on saved information)
    <action> make a phone call
    <call-to> mother
        <phone-number> 415-555-1212
    <call-when-date> mother (birthday)
        <birthday> November 12th
    <call-when-time> (VPA checks schedule and finds an available time.) 9:00 AM.
VPA: <earcon and display> REMINDER: 'Call mom' scheduled for November 12th at 9:00 AM. Will repeat reminder every 15 minutes until call is made or reminder is cancelled.
User: "Send her some flowers too"
VPA: (Extracts details from utterance based on context and saved information)
    <action> send
    <send-what> flowers->bouquet
    <send-to-whom> her-> mother
        <name> Jane Doe
        <address-zip>10000
        <address-state> Anystate
        <address-city> Anytown
        <address-street1>100 Main Street
    <send-when-date> mother birthday
        <birthday> November 12th At this point, the VPA checks available resources and determines that the contact for actioning the "send flowers" request is 800Flowers, which is part of the IVR system 20. The VPA would need to have prior knowledge of the resource. It might have this loaded when sold or provided by a VPA partner. Alternatively, the VPA might acquire it when searching for a resource capable of handling the question it is trying to answer. The VPA contacts the IVR and provides a transaction request:

<request-type> send
    <send-where>
        <name> Jane Doe
        <address-zip>10000
        <address-state> Anystate
        <address-city> Anytown
        <address-street1>100 Main Street
        <address-street2> Apartment 12
    <send-when> November 12th
    <send-what> flowers
        <type>???
    <message>???

The initial contact may be similar to an initial inquiry to a semantic web page. The API for the resource would specify what fields would need to be filled. Using the 800 Flowers application as an example, the initial message from the Virtual Assistant might look like this: (http://west.interactive.com/800Flowers/query?input=send+her+some+flowers+too&appid=Siri&action=order+flowers&type=birthday+bouquet&model=XXXX&message=XXXX&toName=Jane+Doe&toAddress=100+Main+Street&toCity=AnyTown&toState=Anystate&toZip=12345&orderid=XXXX&format=text,image,wav). Key elements are: the resource address, text of original query, source of query, various details of the transaction, followed by data forms that the requesting device can handle.

The IVR system 20 determines that the received request relates to an 800Flowers IVR application and begins executing that application. The 800Flowers application assigns a transaction ID to the transaction request and processes the data received from the VPA to determine the data required to complete the transaction data set for the transaction.

If the IVR finds that the initial contact did not contain all the data necessary to complete the transaction it would need to request the missing data in its response to the VPA. This interaction would typically employ standard internet communications. The VPA would typically know of the resource beforehand and what it is capable of handling and what fields it expects to be filled in the initial interaction. If a necessary field is not filled, the resource's response will include a request for that information.

In this example, the interface 22 responds that it needs 2 more pieces of information to complete the transaction data set for the particular transaction—besides that needed for payment. The data fields required are the type of flowers, noted in the "<type>" field and a message to accompany the flowers noted in the "<message>" field. 800Flowers provides bouquet images and appropriate text to the VPA for follow-up queries.

<transaction-id> FL111222
    <send-what> flowers
        <type>???
    <message>???

How the IVR application determines what information is missing may depend on the complexity of the transaction. For a simple transaction the initial inquiry could be checked to see if it contained all the necessary fields and if not requests to fill them would be formulated. For a more complex transaction or a transaction where the answer to one question might raise other questions, the original IVR flow could be used as a guide.

In providing prompts to the user, the text of prompts from the original IVR menu may be provided to the VPA. The VPA may generate its own version of the voice prompt from the text prompt, using any notation in the text prompt to ensure a proper rendition. In an alternative embodiment, the original voice rendition from the IVR menu may be played back to the user through the VPA. If an image, video, or audio recording were critical to responding to the prompt (as in the picture of the bouquet in the 800Flowers example), that would be returned.

When the VPA receives the data request, the VPA determines if the data is available within the data available to the VPA. If the VPA is unable to determine from its own resources what the missing field information should be, the VPA presents the prompts to the user as follows:

VPA: <earcon and displays sample flower arrangements from 800Flowers with description and price formatted for a smart phone screen>

VPA: (Checks for similar transactions with same resource—800Flowers may be able to supply this type of information as it also now has the caller's ID)

VPA: What would you like to send? Last year you sent her these. <display scrolls to specific item and expands image to full screen>

User: "Yeah that looks good."

VPA: What do you want to say on the card?

User: "Happy birthday mom, love Johnny"

The VPA then re-connects with the 800Flowers IVR as follows, providing the previously received transaction ID and the now complete transaction data set including the "<type>" and "<message>" fields:

<transaction-id> FL111222
    <request-type> send
    <send-where> her (mother)
        <name> Jane Doe
        <address-zip>10000
        <address-state> Anystate
        <address-city> Anytown
        <address-street1>100 Main Street
        <address-street2> Apartment 12
    <send-when> November 12th
    <send-what> flowers
        <type>#1234
    <message>"Happy birthday mom, love Johnny"

The 800Flowers interface determines that the order is completely defined, i.e. the transaction data set is complete, and requests payment method and details:

<transaction-id> FL111222
    <payment-method>???
    (VPA sends credit card information on file)
    <transaction-id> FL111222
    <payment-method> credit card
    <type> VISA
    <number>1111-2222-3333-4444
    <name> John E. Doe
    <exp-date> January 2012

800Flowers checks and accepts card information then sends full description and asks for confirmation:

<transaction-id> FL111222
    <confirm>???

VPA: <earcon and display> Your order is for a Fall Colors bouquet with a card reading 'Happy birthday mom, love Johnny' to be delivered to Jane Doe at 100 Main Street, Anytown, Anystate on November 12th. Total price is $49.95. To be charged to your VISA card on file.

User: "Do it."

VPA sends confirmation to 800Flowers:

<transaction-id> FL111222
    <confirm> yes

800Flowers completes transaction.

In the example described above, the VPA updates the transaction request with the missing data fields by providing a complete transaction request including all of the data fields of the transaction request. In an alternative embodiment, the VPA may supplement the existing transaction request, identified by the transaction ID, by providing only the missing data fields that were requested by the IVR.

For the 800Flowers example, the transaction data set is considered to be separate from the payment data. That is, the transaction data set comprises the parameters of an item to be purchased, not the payment type by which the item is purchased. In the 800Flowers example discussed above, the item purchased is an order of flowers with message and their delivery to an address. The parameters of the item are thus that the item is flowers, the flower type, the message, and the parameters of the delivery, i.e. who, address, etc.

The embodiments described above build the semantic resources required so that existing IVR systems with their associated IVR applications and transaction agents can become "visible" to VPAs of smart phone devices. The embodiments therefore overcome the need to build new VPA applications, since the underlying transaction agent is already present in an IVR form.

The components of the IVR system 20 may be embodied in hardware, software, firmware or a combination of hardware, software and/or firmware. In a hardware embodiment, the interface may be executed on one or more processors of the IVR system 20. The interface 22 may be stored as a set of executable instructions in a memory of the IVR system that is operatively associated with the processor(s).

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for providing a transaction to a mobile device executing a Virtual Personal Assistant (VPA) from an Interactive Voice Response (IVR) system comprising one or more IVR applications configured to provide one or more transactions to phone devices using an interactive voice response menu comprising a script of voice prompts through which the respective IVR application obtains data for a transaction data set of the respective transaction during a telephone call to a user using a telephone handset, the IVR system configured to receive responses to the voice prompts from a user at a telephone handset during the telephone call, the method comprising:

providing an interface in the IVR system for interfacing between the IVR system and a user, the interface configured for receiving a transaction request from a VPA of the mobile device;

establishing a connection between a mobile device executing a VPA and the interface;

receiving into the interface of the interactive voice response system from the VPA a transaction request for a transaction provided by the IVR system, the transaction request including user data for a transaction;

determining an IVR application from the transaction request, the IVR application comprising a sequential script of voice prompts configured to prompt for data using a script of voice prompts; and executing the determined IVR application in the interface to provide the transaction pertaining to the IVR application to a user of the mobile device from which the transaction request was received; wherein executing the determined IVR application comprises:

determining a plurality of data fields required for the IVR application comprising processing the sequential script of voice prompts so that whenever a data field is encountered in the script, the interface replaces one or more voice prompts with a search of the user data provided by the VPA;

processing the transaction request in the interface to extract data for the plurality of data fields; and providing the extracted data fields to the IVR application.

2. The method of claim 1 wherein executing the determined IVR application comprises:

determining one or more required data fields of the IVR application;

processing the transaction request to determine one or more of the required data fields missing from the transaction request; and indicating from the interface of the IVR to the VPA the one or more missing data fields.

3. The method of claim 2 comprising:

receiving the one or more missing data fields from the VPA;

passing a transaction data set comprising the received one or more missing data fields from the IVR application to a transaction agent of the IVR system; and executing the transaction pertaining to the transaction data set in the transaction agent.

4. The method of claim 3 wherein receiving the one or more missing data fields comprises receiving a transaction request comprising a complete transaction data set from the VPA into the interface.

5. The method of claim 3 comprising assigning a transaction ID to the transaction request in the interface, wherein indicating the one or more missing data fields comprises indicating the transaction ID.

6. The method of claim 5 wherein receiving the one or more missing data fields comprises receiving the transaction ID and the one or more missing data fields from the VPA, the method further comprising adding the received one or more missing data fields to the required data fields of the IVR application in the interface.

7. The method of claim 2 wherein indicating the one or more missing data fields comprises:

providing a machine understandable semantic request for one or more of the one or more missing data fields that can be interpreted by the VPA; and providing one or more user presentations that prompt the user for one or more of the one or more missing data fields.

8. The method of claim 7 wherein the one or more user presentations comprise one or more audio recordings obtained from the IVR application.

9. The method of claim 7 comprising:

receiving into the interface a spoken response spoken by the user of the mobile device in response to one or more of the one or more user presentations; and processing the spoken response in the interface to extract one or more of the missing data fields from the spoken response.

10. The method of claim 1 wherein the transaction request comprises a spoken input spoken by the user of the mobile device, the method comprising applying a statistical language model to the spoken input in the interface to determine the IVR application pertaining to the transaction request.

11. The method of claim 1 wherein executing the determined IVR application in the interface comprises providing a sequence of prompts from the IVR to the VPA according to a work flow of the determined IVR application.

12. An Interactive Voice Response (IVR) system comprising:

one or more transaction applications executable by at least one processor of the IVR system, each of the one or more transaction applications programmed to obtain a transaction data set for a transaction of the respective transaction application using a series of voice prompts;

a transaction agent configured to receive a transaction data set for a transaction and execute the respective transaction using the received transaction data set; and an interface configured to:

communicate with a Virtual Personal Assistant (VPA) of a mobile device;

execute a transaction application in response to a transaction request received from the VPA;

convert one or more voice prompts of a transaction application to one or more data requests; and provide the one or more data requests to the VPA;

wherein the one or more data requests are interpreted by the VPA and wherein the VPA provides responses to the one or more data requests using data stored on the mobile device without needing to prompt a user of the mobile device;

wherein an IVR application from the transaction request is determined, the IVR application comprising a sequential script of voice prompts configured to prompt for data using a script of voice prompts;

wherein a plurality of data fields required for the IVR application is determined comprising the sequential script of voice prompts being processed such that whenever a data field is encountered in the script, the interface replaces one or more voice prompts with a search of the user data provided by the VPA;

wherein the transaction request in the interface is processed to extract data for the plurality of data fields; and wherein the extracted data fields are provided to the IVR application.

13. The system of claim 12 wherein the interface is configured to determine one or more required data fields of the transaction application;

process the transaction request to extract one or more of the one or more required data fields;

provide the extracted data fields to the transaction application.

14. The system of claim 12 wherein the interface is configured to:

determine one or more required data fields of the transaction application;

process the transaction request to determine one or more of the required data fields missing from the transaction request; and request the missing data fields from the VPA.

15. The system of claim 14 wherein the interface is configured to request the one or more missing data fields by:

providing to the VPA a machine understandable semantic request for one or more of the one or more missing data fields that can be interpreted by the VPA; and providing to the VPA one or more user presentations that prompt the user for one or more of the one or more missing data fields.

16. The system of claim 15 wherein the one or more user presentations comprise one or more audio recordings obtained from the IVR application.

17. The system of claim 15 wherein the interface is configured to:

receive a spoken response spoken by the user of the mobile device in response to one or more of the one or more user presentations; and process the spoken response to extract one or more of the missing data fields from the spoken response.

18. A non-transitory computer readable medium comprising computer executable instructions, that, when executed by one or more processors, cause the one or more processors to:

receive a transaction request from a Virtual Personal Assistant (VPA) of a mobile device;

determine an Interactive Voice Response (IVR) application pertaining to the transaction request, the IVR application configured to provide one or more transactions to phone devices using an interactive voice response menu comprising a series of voice prompts through which the IVR application obtains data for a transaction data set of the respective transaction;

convert one or more voice prompts within the IVR application to one or more semantic data requests understandable by the VPA; and provide the one or more semantic data requests to the VPA;

wherein the one or more semantic data requests are interpreted by the VPA and wherein the VPA responds to the one or more semantic data requests using data stored on the mobile device without needing to prompt a user of the mobile device;

wherein an IVR application from the transaction request is determined, the IVR application comprising a sequential script of voice prompts configured to prompt for data using a script of voice prompts;

wherein a plurality of data fields required for the IVR application is determined comprising the sequential script of voice prompts being processed such that whenever a data field is encountered in the script, the interface replaces one or more voice prompts with a search of the user data provided by the VPA;

wherein the transaction request in the interface is processed to extract data for the plurality of data fields; and wherein the extracted data fields are provided to the IVR application.

19. The non-transitory computer readable medium according to claim 18 comprising instructions for providing one or more data fields from the transaction request to the IVR application.

* * * * *